US009007258B2

(12) United States Patent
Kurono

(10) Patent No.: US 9,007,258 B2
(45) Date of Patent: Apr. 14, 2015

(54) RADAR DEVICE AND METHOD OF CALCULATION OF RECEIVE POWER IN RADAR DEVICE

(75) Inventor: Yasuhiro Kurono, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 510 days.

(21) Appl. No.: 13/323,290

(22) Filed: Dec. 12, 2011

(65) Prior Publication Data

US 2012/0194379 A1 Aug. 2, 2012

(30) Foreign Application Priority Data

Feb. 1, 2011 (JP) .................................. 2011-020058

(51) Int. Cl.
*G01S 13/00* (2006.01)
*G01S 13/42* (2006.01)
*G01S 13/34* (2006.01)

(52) U.S. Cl.
CPC ............... *G01S 13/42* (2013.01); *G01S 13/345* (2013.01)

(58) Field of Classification Search
USPC ......................................... 342/146, 147, 196
See application file for complete search history.

(56) References Cited

U.S. PATENT DOCUMENTS

| 7,692,574 | B2 | 4/2010 | Nakagawa | |
|---|---|---|---|---|
| 2004/0027282 | A1 | 2/2004 | Kishigami et al. | |
| 2007/0120730 | A1* | 5/2007 | Takano et al. | 342/70 |
| 2008/0088498 | A1* | 4/2008 | Suzuki et al. | 342/90 |
| 2008/0122681 | A1 | 5/2008 | Shirakawa | |
| 2009/0073026 | A1 | 3/2009 | Nakagawa | |
| 2010/0106440 | A1* | 4/2010 | Richmond | 702/71 |
| 2011/0050500 | A1* | 3/2011 | Shirakawa | 342/378 |

FOREIGN PATENT DOCUMENTS

| EP | 1 850 147 A1 | 10/2007 |
|---|---|---|
| EP | 2 048 514 A1 | 4/2009 |
| JP | A-2007-147554 | 6/2007 |
| JP | B2-4415040 | 2/2010 |
| WO | WO 2006/067869 A1 | 6/2006 |

OTHER PUBLICATIONS

Mar. 27, 2012 Extended European Search Report issued in European Application No. 11194274.4.
Jul. 1, 2014 Office Action issued in Japanese Patent Application No. 2011-020058 (with translation).

* cited by examiner

*Primary Examiner* — Timothy A Brainard
(74) *Attorney, Agent, or Firm* — Oliff PLC

(57) ABSTRACT

An electronic scan type radar device which uses a high resolution performance processing to estimate directions of arrival of radio waves, wherein powers of arrival waves received for targets are accurately calculated, that is, a vehicle-mounted radar device utilizing electronic scan which uses a predetermined angle estimation system to estimate directions of arrival of reflected waves, comprising finding mode vectors for angles calculated from the receive signals of the antennas, decomposing a vector of the receive signals into directions of the mode vectors, and defining the lengths of the decomposed vectors the receive powers of the reflected waves arriving from the targets. Due to this method, even if there are targets, it is possible to accurately calculate the powers of the arrival waves, whereby pairing is accurately performed, the precision of detection of targets is improved, and erroneous operation of a vehicle-mounted radar device utilizing electronic scans is prevented.

10 Claims, 11 Drawing Sheets

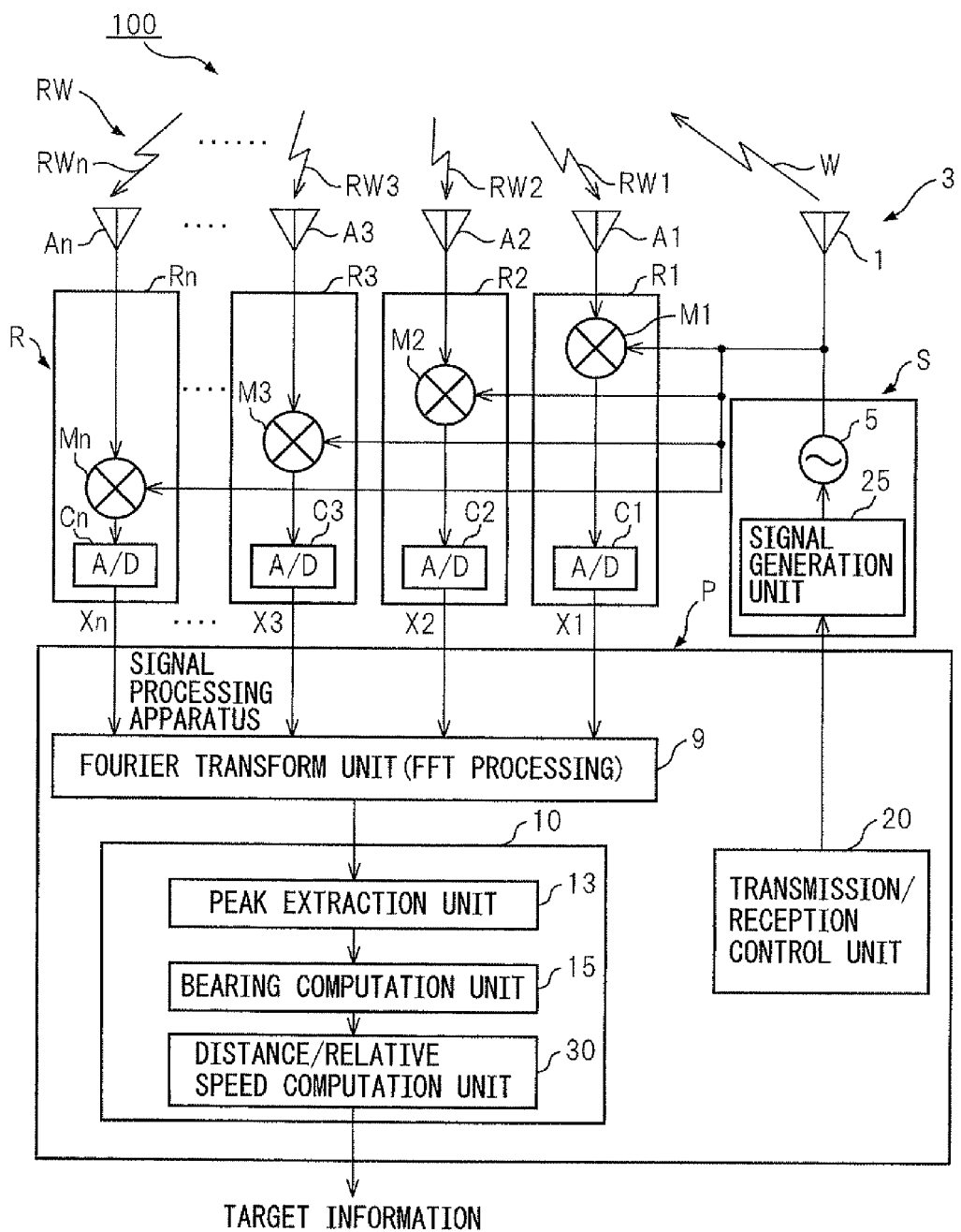

FFT RESULTS OF RECEIVE ANTENNA A1
(FREQUENCY SPECTRUM)

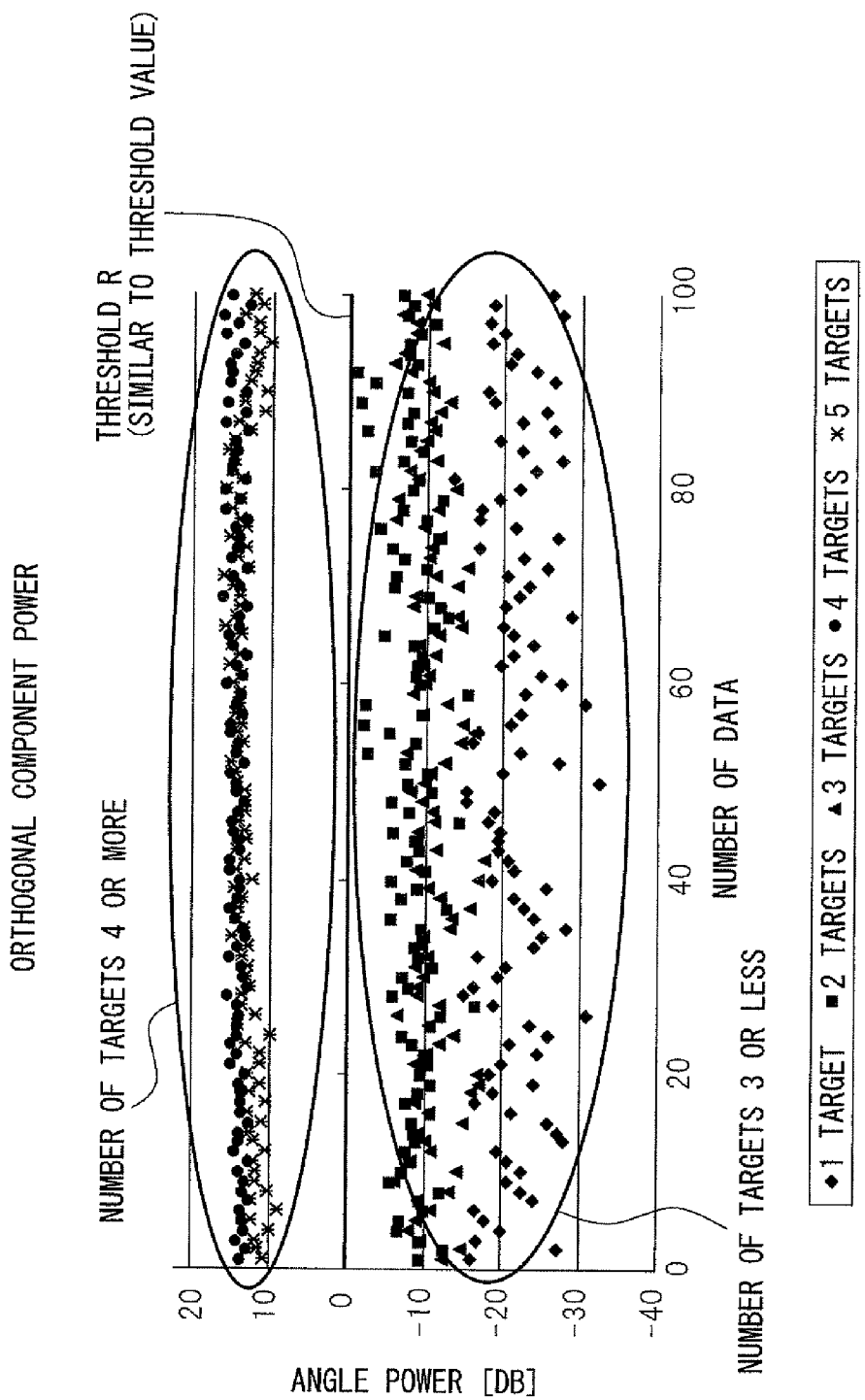

RADAR DEVICE AND METHOD OF CALCULATION OF RECEIVE POWER IN RADAR DEVICE

CROSS-REFERENCE TO RELATED APPLICATION

This application claims priority from, and incorporates by reference the entire disclosure of, Japanese Patent Application No. 2011-020058 filed on Feb. 1, 2011.

BACKGROUND OF THE INVENTION

1. Field of the Invention

The present invention relates to a radar device and a method of calculation of receive power in that radar device, more particularly relates to a radar device which receives radio waves sent from a vehicle and reflected back from a target at a plurality of receive antennas to detect a position of the target and a method of calculation of receive power in that radar device.

2. Description of the Related Art

In the past, there have been radar devices which continuously measure the distance and direction of preceding vehicles or targets in the front (obstacles) or of vehicles or other targets approaching from the rear relative to a vehicle being driven by a user and which prevent collisions or enable automatic driving. Such a radar device sent out transmit waves from an antenna installed in the vehicle, received reflected waves bounced back after hitting a target at another antenna, processed the receive signals, and estimated the direction of arrival the reflected waves to detect the target. As the method for estimating the direction of arrival of reflected waves, the DBF method, Capon method, LP method, minimum norm method, MUSIC method, ESPRIT method, and PRISM method are known.

DBF: Digital Beam Forming
LP: Linear Prediction
MUSIC: Multiple Signal Classification
ESPRIT: Estimation of Signal Parameters via Rotational Invariance Techniques
PRISM: Propagator method based on an Improved Spatial-Smoothing Matrix In the method of estimation of the direction of arrival of reflected waves, the device sends out transmit waves consisting of radio waves modulated in frequency up and down, receives waves reflected from a target by electronic scan radar using a plurality of receive antennas, estimates the direction of arrival of the target at each peak from the peak frequency signals at the up time and down time of the frequency, and then uses the powers as the basis for pairing to calculate the distance and relative speed. The electronic scan radar described in Japanese Patent No. 4415040 found the vectors of the frequency spectrums which were detected for the antennas in the up section of two frequencies, found the combined value when making the vectors of the spectrums of the different frequencies the same angle, and found the distance etc. of a target from the combined value of the vectors. In high resolution processing, as representative systems comparing the spectrum values with the power, there are the DBF method and the Capon method. For this reason, when finding the power of a direction of arrival, the DBF method or the Capon method has mostly been used.

Further, as the method of calculation of the power of a target, up until now the Capon method has mostly been used. The reason is that in the DBF method, other arrival waves are received at the side lobes, so sometimes the power of the reflected waves could not be accurately calculated. As opposed to this, in the Capon method, by turning the main lobe toward a certain direction and simultaneously minimizing the contribution from other directions to the output, the power of the reflected waves is found more accurately than the DBF method. That is, compared with the DBF method, in the Capon method, the spectrum values are output proportionally by the power of the receive waves, so the power of the reflected waves is accurately calculated. Note that, when estimating the direction of arrival of the reflected waves, usually the spatial average method is used for removing the cross correlation components by preprocessing of angle estimation.

In this regard, when using the Capon method to calculate the power of the reflected waves, if there are a plurality of targets, reflected waves from the plurality of targets end up being received by the antennas and the cross correlation components of the targets are not removed at the time of preprocessing of angle estimation using the spatial average method, so there is the problem that the receive power cannot be accurately calculated. This becomes remarkable when there are a small number of receive antennas or when there are a small number of snapshots.

Further, in an electronic scan radar device using a plurality of receive antennas, the receive power value of the arrival waves is used conditional on pairing of the targets obtained in the up section of the frequency and targets obtained in the down section of the frequency. Therefore, if calculation of the accurate receive power is not possible, the following problems arise.

(1) The above condition of pairing includes the condition of "close power values of angles". This is no longer satisfied and the possibility of mispairing occurring rises. This ends up causing the electronic scan radar device to malfunction.

(2) In composite processing of high resolution processing and a system which requires precision of the power such as an amplitude monopulse, it is not possible to improve the precision of the amplitude monopulse.

SUMMARY OF THE INVENTION

Therefore, the present invention has as its object to solve the problems in the related art and provide a radar device which utilizes electronic scan for estimating the direction of arrival of reflected waves, wherein when there are a plurality of targets, reflected waves from the plurality of targets end up being received by the antennas, and the cross correlation components of the targets cannot be removed at the time of preprocessing of angle estimation using the spatial average method, it is possible to accurately calculate the receive powers of the plurality of reflected waves, for example, it is possible to prevent the occurrence of mispairing, and provide a method of calculation of receive power in such a radar device.

To achieve the above object, the radar device of the present invention provides a radar device which sends out radio waves, receives radio waves reflected from at least one target at a plurality of antennas, and has a signal processing unit process the receive signals by a predetermined angle estimation system, estimate directions of arrival of the reflected waves, and calculate receive powers of the reflected waves to detect the targets, which signal processing unit is provided with an angle detecting means for detecting angles based on the receive signals of the antennas, a mode vector calculating means for finding mode vectors for detected angles, a receive signal decomposing means for using the mode vectors as the basis to decompose a vector which combines the receive signals into vectors of the directions of the mode vectors, and a power value calculating means for calculating the magnitudes of the vectors of the mode vector directions of the decomposed receive signal as power values of the detected angles.

Further, a method of calculation of receive power in a radar device of the present invention for achieving the above object is a method of calculation of receive power in a radar device comprising sending out radio waves, receiving radio waves which are reflected from at least one target at a plurality of antennas, processing the receive signals using a predetermined angle estimation system, estimating the directions of arrival of the reflected waves, and calculating receive powers of the reflected waves to detect the targets, characterized by detecting angles from receive signals of the antennas, finding mode vectors for the detected angles, using these mode vectors as the basis to decompose a vector of the receive signals into vectors of directions of the mode vectors, and defining the magnitudes of the vectors of the mode vector directions of the decomposed receive signals as the power values of the detected angles.

According to the vehicle-mounted radar device of the present application and the method of calculation of receive power in such a radar device, even if there are a plurality of targets, it is possible to accurately calculate the receive powers of a plurality of antennas and, for example, possible to accurately perform pairing. As a result, there are the advantageous effects that the precision of detection of targets is improved and erroneous operation of a vehicle-mounted radar device utilizing electronic scans is prevented.

BRIEF DESCRIPTION OF THE DRAWINGS

The present invention is illustrated by way of example, and not limitation, in the figures of the accompanying drawings in which like references indicate similar elements. Note that the following figures are not necessarily drawn to scale.

FIG. 1 is a view of the configuration which shows the configuration of an FMCW type radar device according to an embodiment of the present invention.

FIG. 11 is a distribution chart which shows the distribution of values of angle powers in power values which are found by the present invention from receive signals when, as shown in FIG. 10A to FIG. 10E, increasing the number of targets placed in front of the evaluation system one at a time from one to five and sending radio waves 100 times in the evaluation systems.

DESCRIPTION OF THE PREFERRED EMBODIMENTS

Figure 2A:
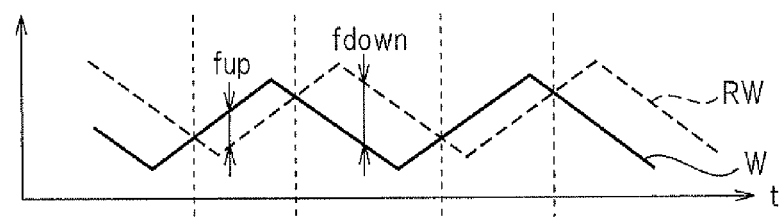
FIG. 2A is a waveform diagram of a transmit signal which is emitted from a sending unit of the radar device which is shown in FIG. 1.

Below, the attached drawings will be used to explain in detail the aspects of the present application based on specific embodiments.

FIG. 1 shows the configuration of a radar device 100 of one embodiment of the present invention. The radar device 100 of this embodiment is comprised of a sending unit S, a receiving unit R, and a signal processing system P. The signal processing system P, while illustration of the detailed configuration is omitted, is configured provided with a microprocessor. There are also a Fourier transform unit 9, a distance/relative speed processing unit 10, and a sending/receiving control unit 20.

The sending unit S is provided with an oscillator 5 and a signal generation unit 25. The signal generation unit 25 is controlled by a sending/receiving control unit 20 located at the signal processing system P. The signal generation unit 25 supplies a triangular wave-shaped modulated signal (triangular waves) as the transmit signal to the oscillator 5 where frequency modulation is performed. A transmit antenna 1 transmits radio waves (transmit waves) W. In this embodiment, the FMCW system is used. The oscillator 5 generates transmit waves which change by a certain repeating frequency due to the triangular waves of the signal generation unit 25. Therefore, the transmit waves W are FMCW waves where the frequency rises and falls about an emitted frequency at the time of no modulation by the oscillator 5 by a predetermined repeated period. This transmit waves W are amplified in power by a not shown transmitter then are sent (emitted) from the transmit antenna 1 toward targets.

The radar device 100 of this embodiment is mounted in a car. The transmit waves W are sent toward the front or the rear of the vehicle which mounts the radar device 100. The transmit waves W which are sent from the transmit antenna 1 to the front are reflected at a not shown target, for example, a preceding vehicle or stationary object etc. The reflected waves RW return toward the vehicle and are received by the receiving unit R of the radar device 100.

The receiving unit R is comprised of an array antenna 3 which is provided with n number of receive antennas A1 to An and individual receiving units R1 to Rn which are connected to the same. The individual receiving units R1 to Rn respectively have mixers M1 to Mn and A/D converters (described as A/D in the figure) C1 to Cn. The receive signals which are obtained from the reflected waves RW1 to RWn which are received at the array antenna 3 are amplified by a not shown low noise amplifier, then sent to the mixers M1 to Mn. The mixers M1 to Mn receive as input the transmit signal from the oscillator 5 of the sending unit S. At the mixers M1 to Mn, the transmit signal and the receive signals are respectively mixed whereby beat signals having as frequencies the differences of the frequency of the transmit signal and the frequencies of the receive signals are obtained. The beat signals from the mixers M1 to Mn are converted at the A/D converters C1 to Cn to digital receive signals X1 to Xn, then are supplied to a fast Fourier transform device of the Fourier transform unit 9 where each of the digital receive signals X1 to Xn is analyzed for frequency by a fast Fourier transform (FFT processing).

In the radar device 100 of this embodiment, when the preceding targets move together, the frequencies of the reflected waves RW include Doppler frequency components which are proportional to the relative speeds of the targets and the vehicle. Further, in the present embodiment, FMCW is employed as the modulation scheme, so when this frequency trend is a linear chirp, the frequencies of the reflected waves RW include, in addition to Doppler components, frequency components which reflect the delay times which are added due to the transmit waves being propagated over the relative distances between the targets and the vehicle. As explained above, the transmit signal is a linear chirp signal, so the frequency of the transmitted waves W, as shown by the solid line in the waveform diagram of FIG. 2A, repeats a period in which the frequency rises in a straight line (up section) and a period in which it descends (down section). Further, the reflected waves RW, as shown by the broken line in the waveform diagram of FIG. 2A, compared with the transmit waves W, are simultaneously affected by both the Doppler frequency trend due to the relative speed and the time delay due to the relative distance, so the difference in frequencies between the transmit wave W and the reflected waves RW generally takes different values in the up section and the down section.

Figure 2B:
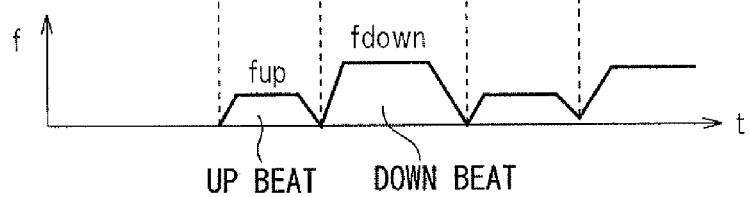
FIG. 2B is a waveform diagram which shows a change in frequency with respect to time of a reflected signal which is bounded back from a target and beat signals in a mixer.

That is, the frequency of the difference of frequencies between the transmit wave W and the reflected waves RW becomes fup in the up section and fdown in the down section. Therefore, at the mixers M1 to Mn, a beat signal shown in the waveform diagram of FIG. 2B in which the Doppler frequency is superposed on the frequency based on the delay time is obtained. The beat signal in the up section is called the "UP beat", while the beat signal in the down section is called the "DOWN beat". Note that, in the case of FIG. 2A and FIG. 2B, the frequency fdown of the DOWN beat is larger than the frequency fup of the UP beat. The relative speed of the direction of a smaller relative distance from the target (approach direction) is shown.

Figure 2C:
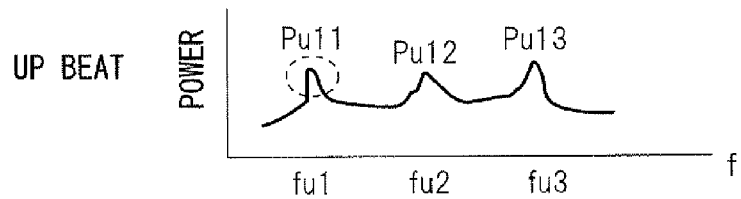
FIG. 2C is a waveform diagram of a frequency spectrum which shows the results of FFT processing of an UP beat which is output from an individual receiving unit of one receive antenna which is shown in FIG. 1.
Figure 2D:
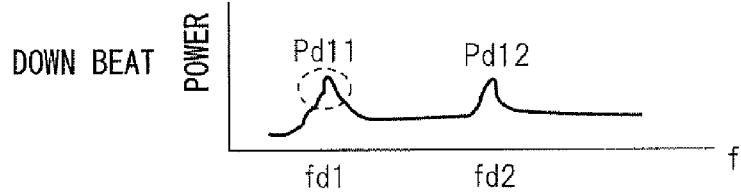
FIG. 2D is a waveform diagram of a frequency spectrum which shows the results of FFT processing of a DOWN beat which is output from an individual receiving unit of one receive antenna which is shown in FIG. 1.

The beat signals of the UP beat and the DOWN beat which are obtained at the mixers M1 to Mn, as explained above, are converted at the A/D converters C1 to Cn to the digital receive signals X1 to Xn which are then supplied to the Fourier transform unit 9. At the Fourier transform unit 9, the UP beat frequency fup components and the DOWN beat frequency fdown components from the mixers M1 to Mn are supplied to the fast Fourier transform device where a fast Fourier transform is applied for frequency analysis (FFT processing). Here, the results of the FFT processing of the receive antenna A1 are shown in FIG. 2C and FIG. 2D. The waveform diagram of FIG. 2C illustrates the frequency spectrum which is obtained from the UP beat frequency fup component, while the waveform diagram of FIG. 2D illustrates the frequency spectrum which is obtained from the DOWN beat frequency fdown component.

As illustrated in FIG. 2C, in the frequency spectrum of the FFT results of the UP beat of the antenna A1, there are peaks Pu11, Pu12, and Pu13 at the UP frequencies fu1, fu2, and fu3. For the receive antennas A2 to An as well, similar FFT results having the same peak frequencies are obtained. For example, at the antenna A2, FFT results are obtained with peaks Pu21, Pu22, and Pu23 at the UP frequencies fu1, fu2, and fu3. Further, at the frequency spectrum of the FTT results of the DOWN beat of the antenna A1, there are peaks Pd11 and Pd12 at the DOWN frequencies fd1 and fd2. For the receive antennas A2 to An as well, similar FFT results having the same peak frequencies are obtained. For example, at the antenna A2, FFT results are obtained with peaks Pd21 and Pd22 at the DOWN frequencies fd1 and fd2.

That is, the receive antennas A1 to An receive reflected radio waves RW from the same targets, so frequency spectrums of the same shapes having the same peak frequencies are obtained by FFT processing. However, the phases of the reflected waves differ depending on the receive antennas, so the phase information of the peaks of the same frequencies will differ at the different receive antennas.

Returning to FIG. 1, the output of the Fourier transform unit 9 is supplied to a peak extraction unit 13 of the distance/relative speed processing unit 10. At the peak extraction unit 13, for each of the receive antennas A1 to An, at the frequency spectrum obtained by the FFT processing, the peaks of a predetermined power or more are extracted at the UP beat and DOWN beat and the frequency, power, and phase information of the extracted peaks (below, called the "peak frequency information") are extracted. The peak frequency information which was extracted at the peak extraction unit 13 is supplied to a bearing computation unit 15.

Figure 3:
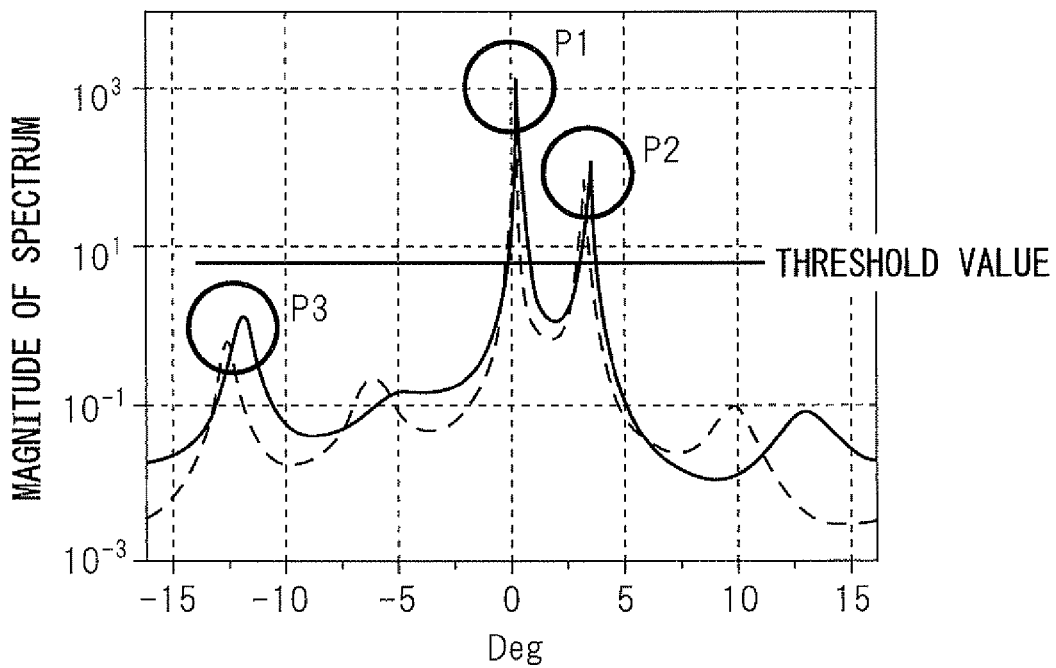
FIG. 3 is a graph which shows the magnitude of a spectrum with respect to angle in the case of receiving reflected waves which are bounded back from a target by a plurality of antennas which are arranged at equal intervals and of processing this by a conventional angle estimation system.

One peak in the frequency spectrum usually includes information of a plurality of targets, so it is necessary to separate the targets from the single peak and estimate the angles of the separated targets. For this reason, at the bearing computation unit 15, the peak frequency information of the peaks having the same frequencies at the UP side and DOWN side at all receive antennas A1 to An (for example, in the case of an UP beat, Pu11, Pu21, . . . Pun1, while in the case of a DOWN beat, Pd11, Pd21, . . . Pdn1) are used as the basis to find the angle spectrums such as shown in FIG. 3 by computation. As the method of finding the angle spectrums, the Capon method, DBF method, or other systems may be used. The solid line in FIG. 3 illustrates the angle spectrum of the UP peak frequency fu1 (Pu11, Pu21, . . . Pun1), while the broken line illustrates the angle spectrum of the DOWN peak frequency fd1 (Pd11, Pd21, . . . Pdn1).

At the bearing computation unit 15, in the angle spectrums which are shown in FIG. 3, the peaks having powers of a threshold value or more, here, the peaks P1 and P2, are judged to be targets and their angles and powers are extracted. As explained in further detail, the angle spectrum is found for each peak frequency in FFT processing. In the examples shown in FIG. 2C and FIG. 2D, five angle spectrums at five frequencies fu1, fu2, fu3, fd1, and fd2 are calculated. FIG. 3 shows the angle spectrum which is found from the peaks of the UP peak frequency fu1 and the angle spectrum which is found from the peaks of the DOWN peak frequency fd1. This shows that there are two targets P1 (angle 0 [Deg]) and P2 (angle about 3 [Deg]) at both the UP peak frequency fu1 and at the DOWN peak frequency fd1. The results which are obtained at the bearing computation unit 15 become as illustrated in FIG. 4.

Figure 4:
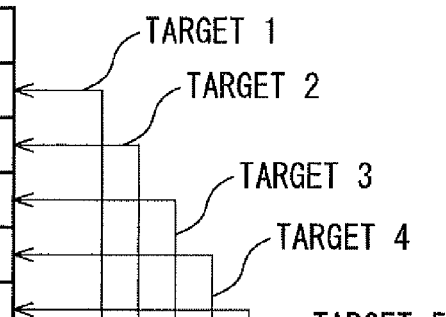
FIG. 4 is a view which explains a state of pairing of peak information at an UP beat side and peak information of a DOWN beat side in a bearing computation unit of FIG. 1.

The distance/relative speed computation unit 30 uses the data which is shown in FIG. 4 as the basis to pair data having close angles and powers between the UP beat side target information and the DOWN beat side target information. In FIG. 4, the target U1 of the angle $\theta u1$ of the UP beat side frequency fu1 and the target D2 of the angle $\theta d2$ of the DOWN beat side frequency fd1 are shown paired. Detection of five targets is shown. The distances and relative speeds are calculated at the UP frequency and DOWN frequency obtained by the pairing. For the angles of the targets, the average values of the UP beat side and DOWN beat side angles are obtained. The distance and relative speed are found from the UP peak frequency fu1 and the DOWN peak frequency fd1, while the angle is found by $(\theta u1+\theta d2)/2$.

Figure 5:
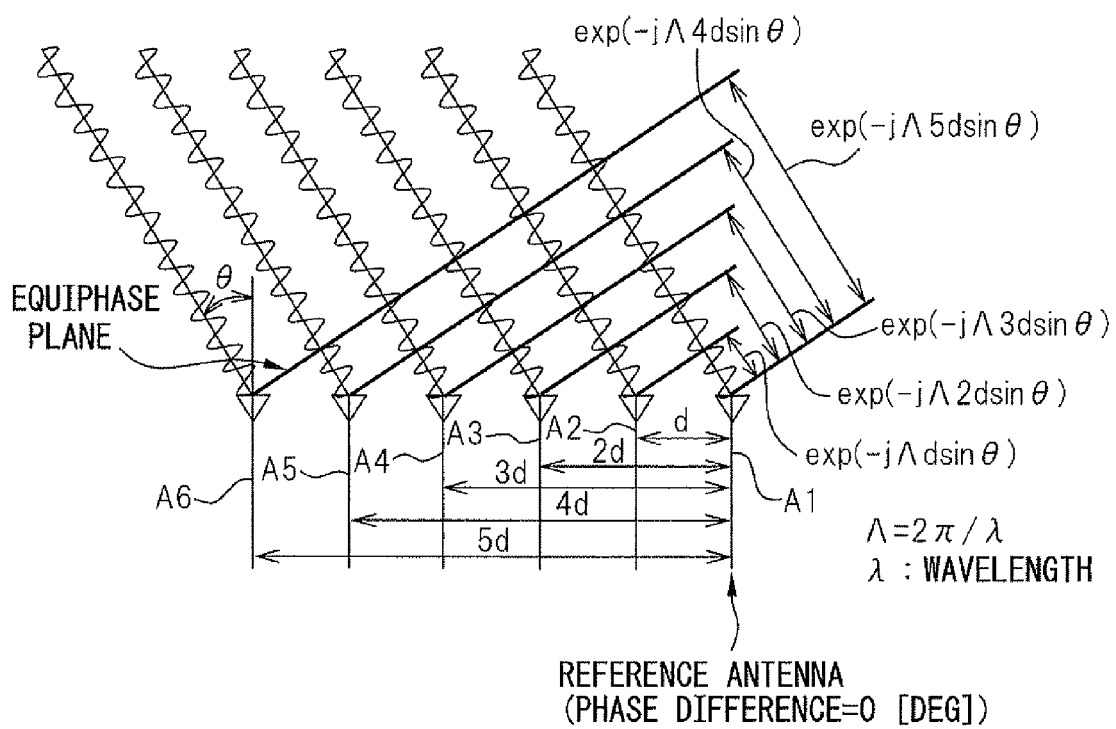
FIG. 5 is a view showing phase differences and mode vectors of antennas in the case of receiving reflected waves which are bounced back from a target by a plurality of antennas which are arranged at equal intervals.

Here, as illustrated in FIG. 5, the receive antennas A1 to An comprise the six antennas A1 to A6. The operation of the bearing computation unit 15 in the case of assuming the arrival of only one radio wave at the antennas A1 to A6 will be explained. Note that, the distance between adjacent antennas is defined as "d", the direction of arrival of the arrival wave with respect to a direction vertical to the line connecting the six antennas A1 to A6 is defined as "$\theta$", and the wavelength of arrival waves is defined as "$\lambda$". In this case, the phase difference $\phi$ the between adjacent antennas becomes $\phi=(2\pi/\lambda)d \sin(\theta)$. Therefore, if the amplitude of the arrival waves at a certain point of time at the first antenna A1 is A(t), the amplitude of the arrival waves at the second antenna A2 at the same point of time becomes $A(t)\exp[j(2\pi/\lambda)d \sin(\theta)]$.

To facilitate the explanation, an array of ideal signals of the different antennas of the signals of the amplitude 1 which arrive from the direction $\theta$ is defined as a "mode vector $a(\theta)$". Further, if considering that the reference point of the equiphase plane at the timing t1 is at the antenna A1, the phases at the antennas A2 to A6 with respect to the antenna A1 at the same timings become as follows:

antenna A2: $\exp[-j(2\pi/\lambda)d \sin(\theta)]$
antenna A3: $\exp[-j(2\pi/\lambda)2d \sin(\theta)]$
antenna A4: $\exp[-j(2\pi/\lambda)3d \sin(\theta)]$
antenna A5: $\exp[-j(2\pi/\lambda)4d \sin(\theta)]$
antenna A6: $\exp[-j(2\pi/\lambda)5d \sin(\theta)]$ Accordingly, the mode vector $a(\theta)$ at this time becomes $a(\theta)=(1, \exp[-j(2\pi/\lambda)d \sin(\theta)], \exp[-j(2\pi/\lambda)2d \sin(\theta)], \exp[-j(2\pi/\lambda)3d \sin(\theta)], \exp[-j(2\pi/\lambda)4d \sin(\theta)],$ and $\exp[-j(2\pi/\lambda)5d \sin(\theta)])^t$.

At the bearing computation unit 15, the angle estimation system Capon method and spatial average method were used to calculate the powers of the directions of arrival of the arrival waves. However, as explained above, with the conventional method of calculation of power of the Capon method, the method was adopted of calculating the power after obtaining the spatial average, so if there were a plurality of targets, cross correlation components of the targets could not be removed at the time of the processing by the spatial average method and the receive powers of the arrival waves could not be accurately calculated.

Figure 6:
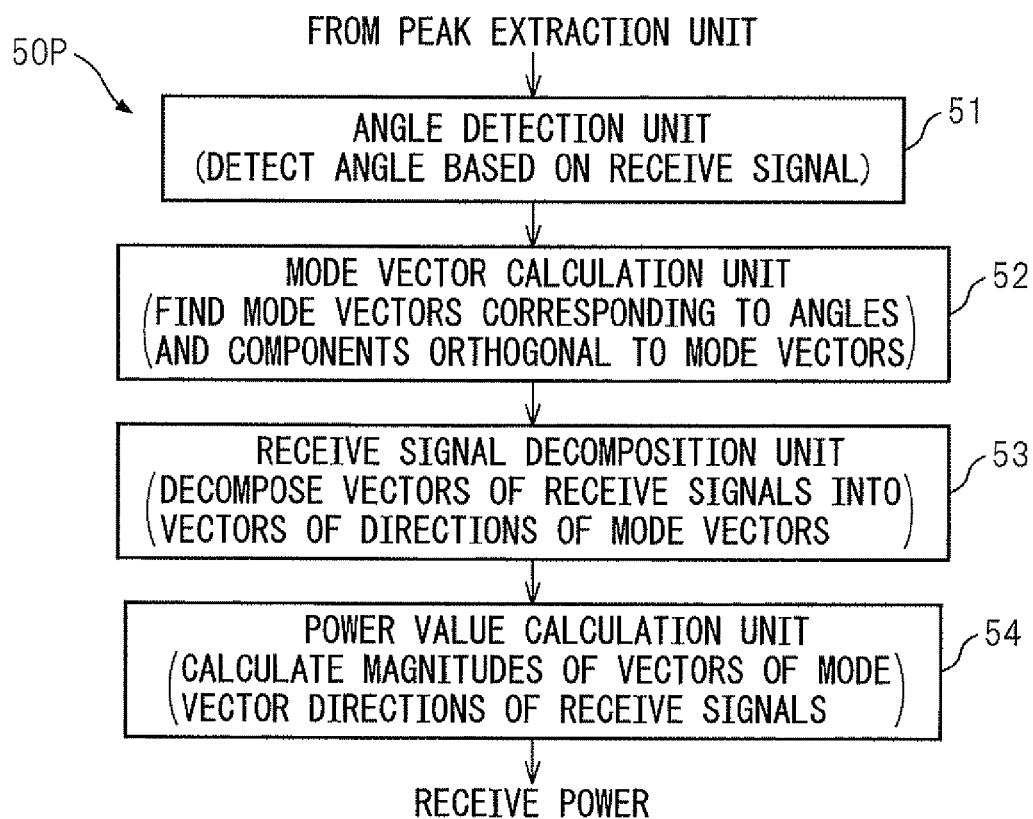
FIG. 6 is a block diagram which shows one example of a receive power calculation unit which is provided at the inside of the bearing computation unit of FIG. 1.

Therefore, in the present invention, the receive signals at the stage before the spatial average is taken are used as they are to calculate the receive powers. This device and method will be explained using FIG. 6 and FIG. 7. FIG. 6 shows an example of the configuration of a receive power calculation unit 50P which is provided inside of the bearing computation unit 15 of FIG. 1. The receive power calculation unit 50P to which the peak frequency information which is extracted by the peak extraction unit 13 (frequency, power, and phase information of peaks) is input includes an angle detection unit 51, mode vector calculation unit 52, receive signal decomposition unit 53, and power value calculation unit 54.

The angle detection unit 51, as explained using FIG. 3 and FIG. 4, extracts the angles of the peaks of the receive signals at the receive antennas which are input from the peak extraction unit 13. At this time, if there are a plurality of targets, a plurality of angles are detected from the receive signals. The mode vector calculation unit 52 finds the mode vectors for the detected angles. Further, the mode vectors are found as theoretical values or measured values for predetermined angles (for example, each 1 [Deg]) and are stored in a not shown memory. By reading out a mode vector corresponding to an angle which is detected by the angle detection unit 51, the mode vector for the detected angle can be found. Further, the receive signal decomposition unit 53 uses the mode vectors as the basis to decompose a vector obtained by combining the peak powers after FFT processing of the receive signals used for the above angle detection into vectors of the directions of the mode vectors and directions of orthogonal components of the same. Note that, at this time, if there are a plurality of peaks after FFT processing of the receive signals, this is performed on the vector combining those peak powers. Further, such vector decomposition is performed for each of the UP section and DOWN section of the triangular waves. The power value calculation unit 54 outputs the magnitudes of the mode vector directions of the decomposed receive signals as the power values of the receive signals.

If using a predetermined angle estimation system, for example, the conventional PRISM method, to find the magnitude of the spectrum with respect to the angles of receive signals, the result becomes as illustrated in FIG. 3. As explained above, the solid line in FIG. 3 shows the angle spectrum of the UP peak frequency fu1 (Pu11, Pu21, . . . Pun1), while the broken line shows the angle spectrum of the DOWN peak frequency fd1 (Pd11, Pd21, . . . Pdn1). Further, the abscissa of FIG. 3 shows the left-right deflection angle [deg] of the transmit wave when defining the front surface of the radar device as 0 [deg]. In this embodiment, corner reflectors (explained later) are assumed to be placed as targets at the 0 [deg] position and the 3 [deg] position. In the present invention, the magnitude of the spectrum showing the power values in FIG. 3 is ignored. Only the angles corresponding to the peak parts P1, P2, and P3 of the magnitude of the spectrum with the circle marks in FIG. 3 are found by calculation. However, the peak P3 is not a peak due to a target, but is used for calculation of the power.

Next, the mode vectors corresponding to the found angles are found, the receive signals are deemed to be a vector of a complex number, the peak power after FFT processing which was used for angle calculation is decomposed into the mode vector directions, and the coefficients at that time are defined as the power values. The specific method of calculation of the receive power will be explained for the case where there are four receive antennas. This calculation method multiplies the receive signals of the basis transition matrix (standard basis is mode vector basis) to find the coefficients of the mode vector bases and finds the norms of the same. Here, the method of finding the orthogonal components will also be explained.

First, the method defines θ1 to θ3 as the angles found by the angle estimation system and codes the mode vectors as follows:

$$a(\theta 1)=(a11, a12, a13, a14)$$

$$a(\theta 2)=(a21, a22, a23, a24)$$

$$a(\theta 3)=(a31, a32, a33, a34)$$

Here, it sets "A" as follows:

$$A = \begin{array}{|c|c|c|} \hline a11 & a21 & a31 \\ \hline a12 & a22 & a32 \\ \hline a13 & a23 & a33 \\ \hline a14 & a24 & a34 \\ \hline \end{array}$$

Next, it calculates the vectors P which are orthogonal to three mode vectors using the propagator method while defining A1 and A2 as follows:

$$A1 = \begin{array}{|c|c|c|} \hline a11 & a21 & a31 \\ \hline a12 & a22 & a32 \\ \hline a13 & a23 & a33 \\ \hline \end{array}$$

$$A2 = \begin{array}{|c|c|c|} \hline a14 & a24 & a34 \\ \hline \end{array}$$

$$P = \begin{pmatrix} (A2*A1^{-1})^H \\ -1 \end{pmatrix}$$

$$= (p1, p2, p3, p4)^t$$

Here, it determines the matrix comprised of the mode vectors plus the orthogonal components as follows:

$$B = \begin{array}{|c|c|c|c|} \hline a11 & a21 & a31 & P1 \\ \hline a12 & a22 & a32 & P2 \\ \hline a13 & a23 & a33 & P3 \\ \hline a14 & a24 & a34 & P4 \\ \hline \end{array}$$

Here, it defines the 1ch to 4ch receive signals as Y1 to Y4 and converts the receive signals to vectors as follows:

$$Y = \begin{array}{|c|} \hline Y1 \\ \hline Y2 \\ \hline Y3 \\ \hline Y4 \\ \hline \end{array}$$

Further, if using B and Y for the following calculations, the coefficients of the bases of the mode vectors and orthogonal components are found.

$$B^{-1}Y = \begin{array}{|l|} \hline bn1(= \text{coefficient of } \theta 1 \text{ bearing}) \\ \hline bn2(= \text{coefficient of } \theta 2 \text{ bearing}) \\ \hline bn3(= \text{coefficient of } \theta 3 \text{ bearing}) \\ \hline bn4(= \text{coefficient of orthogonal components}) \\ \hline \end{array} \quad (=BN)$$

The norms of the bn1 to bn4 found here become the power values of the corresponding bearings of the arrival waves and the power values of the orthogonal components.

On the other hand, the specific method of calculation in the case where there are no orthogonal components of the receive powers becomes as follows. However, this is the case where there are 4 ch receive antennas.

When there are orthogonal components, the following formula stands assuming BN is the value sought.

$$Y=B*BN$$

Here, B is a regular matrix, so the following formula may be calculated.

$$BN=B^{-1}*Y$$

In this regard, where no orthogonal components are included, the following formula stands:

$$Y=A*BN$$

"A" is not a square matrix, so cannot have an inverse matrix. For this reason, least square approximation is used to find the BN. This method first defines the following evaluation function:

$$Q(BN)=\|Y-A*BN\| \text{ (where, } \|\cdot\| \text{ is a vector norm)}$$

Here, it is sufficient to find BN so that Q(BN) becomes 0. Here, if developing Q(BN) further, it becomes as follows where "tr" is the trace of the matrix and "H" is the adjoint matrix.

$$Q(BN) = \|Y - A*BN\|$$
$$= tr((Y - A*BN)^H * (Y - A*BN))$$
$$= tr(Y^H * Y) - tr(Y^H * A * BN) - tr(BN^H * A^H * Y) +$$
$$tr(BN^H * A^H * A * BN)$$

Therefore, it is sufficient that the value of this differentiated by $BN^H$ ($-A^{H}*Y+A^{H}*A*BN$) become 0. From the above, the following formula may be used to calculate BN.

$$BN=(A^{H}*A)^{-1}*A^{H}*Y$$

Figure 7:
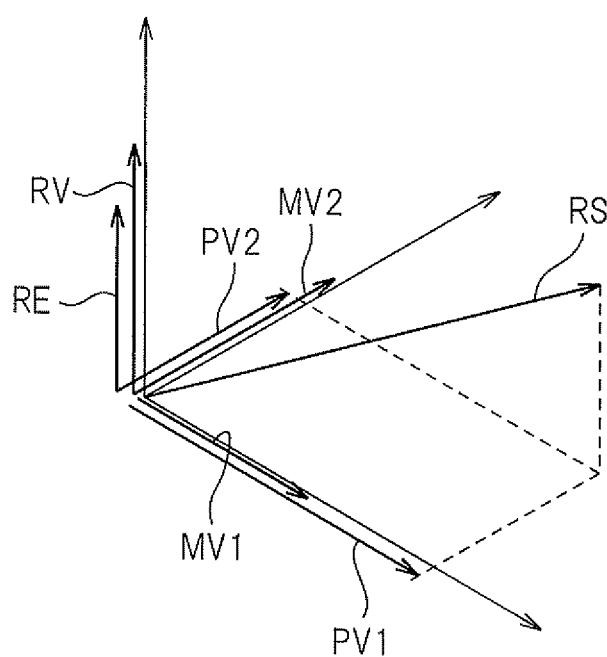
FIG. 7 is a view decomposing a receive signal in the mode vector directions based on the mode vectors for the angles found from the graph of FIG. 3.

FIG. 7 illustrates the present invention which finds the mode vectors MV1 and MV2 corresponding to the angles of the peak parts P1 and P2 found from the "angle-spectrum magnitude" characteristic shown in FIG. 3, deems the vector RS combining the peak powers of the receive signals of the antennas after FFT processing to be a vector of a complex number, decomposes the vector RS in the directions of the mode vectors MV1 and MV2, and defines the magnitudes of the vectors at that time as the power values. From FIG. 7, it is learned that the power value corresponding to the peak part P1 shown in FIG. 3 is shown by the vector PV1, while the power value corresponding to the peak part P2 is shown by the vector PV2.

At this time, by calculating not only the mode vectors MV1 and MV2, but also the vector RV in the direction orthogonal to these mode vectors MV1 and MV2 and the orthogonal component RE, it is possible to further raise the precision. Further, by viewing the magnitude of the orthogonal component RE, it is also possible to judge if arrival waves of more than the separation limit are being received. In addition, as an additional effect, it is possible to suppress the effects of noise included in the receive signal on the power.

As explained above, in the past, receive signals were processed by FFT, then some sort of system was used to calculate the bearings of the received waves and the spectrum values were used as is as the power values. When precision of the power values was particularly required, the powers were recalculated from the spectrum values using the DBF method, Capon method, etc. As opposed to this, in the present invention, the bearings are calculated in the same way as the past to obtain the angles, but "vector decomposition of the receive signals" is employed for calculation of the powers. This is the biggest feature. Below, the effect obtained by such a method of calculation of the power of the present invention will be explained.

Figure 8A:
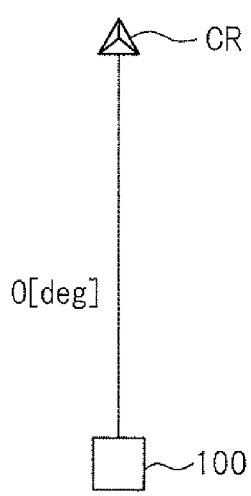
FIG. 8A is a view of the configuration of an evaluation system in which a corner reflector is arranged as a target at a predetermined distance in a 0 [deg] direction of the radar device.
Figure 8B:
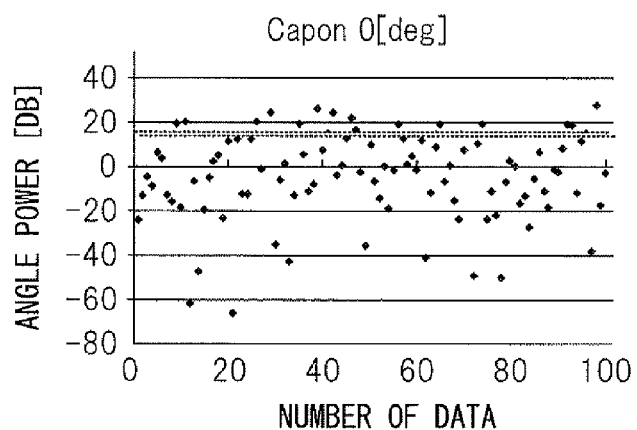
FIG. 8B is a distribution chart which shows the distribution of values of angle powers in power values which are found by the conventional Capon method from receive signals when sending radio waves 100 times from the evaluation system of FIG. 8A.
Figure 8C:
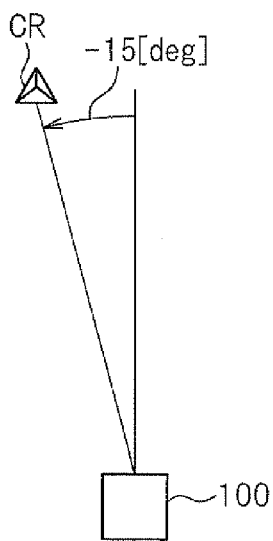
FIG. 8C is a view of the configuration of an evaluation system in which a corner reflector is arranged as a target at a predetermined distance in a −15 [deg] direction of the radar device.

Here, for the radar device 100, two evaluation systems were prepared by setting corner reflectors CR as targets exactly predetermined distances away from the radar device 100 at a position of 0 [deg] such as shown in FIG. 8A and a position of −15 [deg] such as shown in FIG. 8C. Further, data showing the values of the angle powers at power values of receive signals obtained by sending out radio waves 100 times from this radar device 100 and receiving the reflected waves at the antennas was calculated using the conventional Capon method.

Figure 8D:
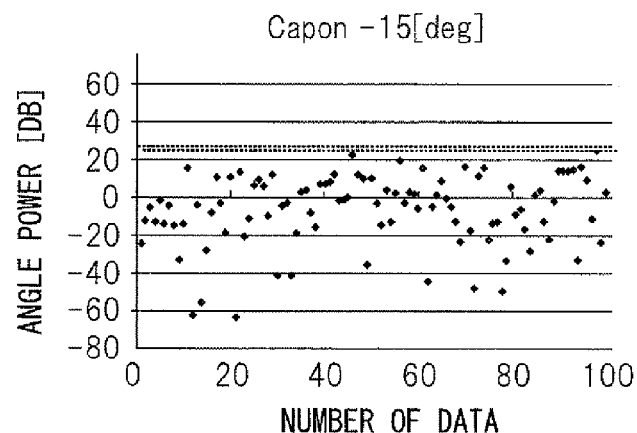
FIG. 8D is a distribution chart which shows the distribution of values of angle powers in power values which are found by the conventional Capon method from receive signals when sending radio waves 100 times from the evaluation system of FIG. 8C.

FIG. 8B shows 100 sets of data for the case of using the evaluation system shown in FIG. 8A, while FIG. 8D shows 100 sets of data for the case of using the evaluation system shown in FIG. 8C. In FIG. 8B and FIG. 8D, the ordinate shows the values of the angle powers [dB] at the power values of the receive signals, while the abscissa shows 100 receive signals as the "number of data". The straight line parts shown by the two broken lines in the data shown in FIG. 8B and FIG. 8D show the true values of the angle powers. As will be understood from the data of FIG. 8B and FIG. 8D, with the conventional system, the fluctuation in the angle powers is extremely great.

Figure 9A:
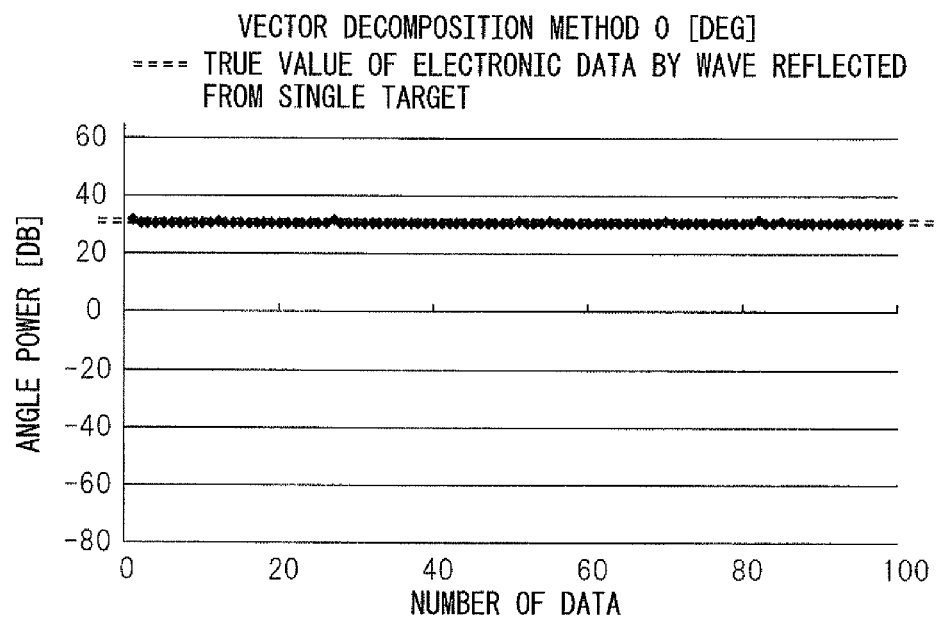
FIG. 9A is a distribution chart which shows the distribution of values of angle powers in power values which are found by the method of the present invention from receive signals when sending radio waves 100 times from the evaluation system of FIG. 8A.
Figure 9B:
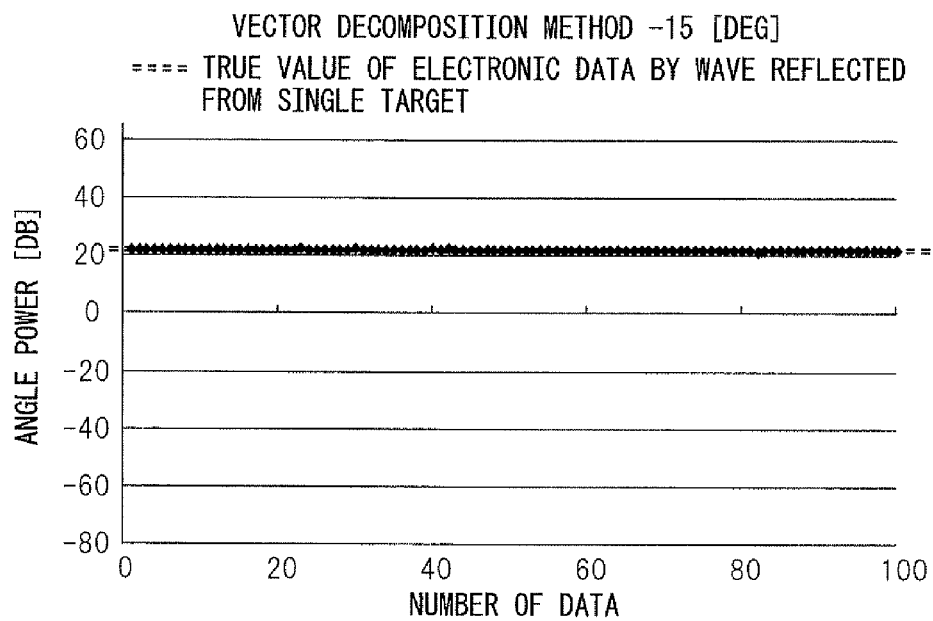
FIG. 9B is a distribution chart which shows the distribution of values of angle powers in power values of the mode vector directions at positions which were calculated by the device of the present invention from receive signals when sending radio waves 100 times from the evaluation system of FIG. 8C.
Figure 10A:
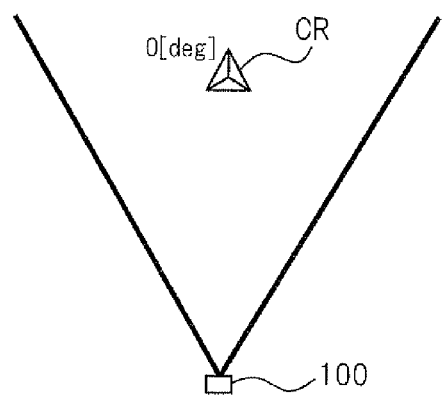
FIG. 10A is a view showing an evaluation system in which one target is set.
Figure 10B:
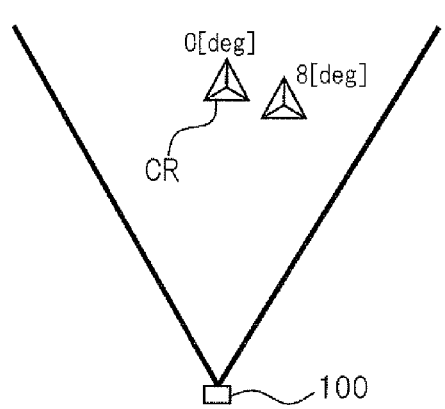
FIG. 10B is a view showing an evaluation system in which two targets are set.
Figure 10C:
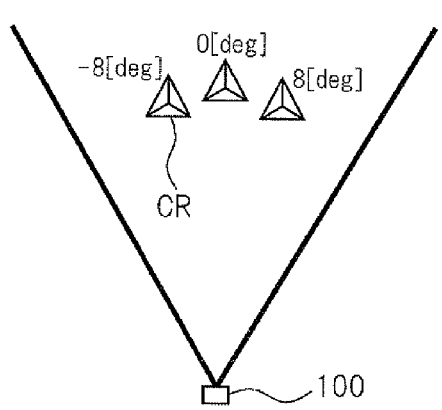
FIG. 10C is a view showing an evaluation system in which three targets are set.
Figure 10D:
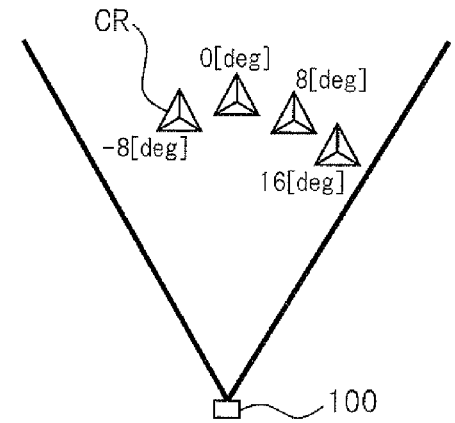
FIG. 10D is a view showing an evaluation system in which four targets are set.
Figure 10E:
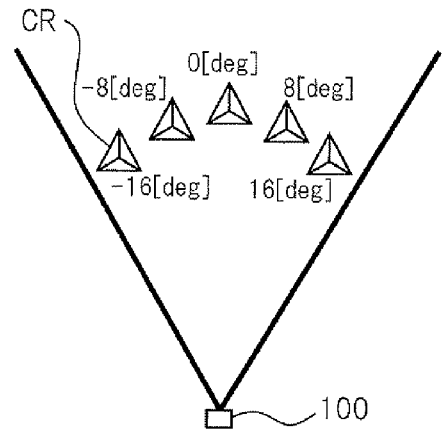
FIG. 10E is a view showing an evaluation system in which five targets are set.

On the other hand, the data showing the angle powers shown in FIG. 9A shows the angle powers at the power values which were measured by using the vector decomposition method of the present invention for 100 receive signals in the case of using the evaluation system shown in FIG. 8A. Further, the data showing the angle powers shown in FIG. 9B shows the angle powers at the power values of the receive signals which were measured by using the vector decomposition method of the present invention for 100 receive signals in the case of using the evaluation system shown in FIG. 8C. In FIG. 9A and FIG. 9B as well, the straight line parts shown by the two broken lines show the true values of the angle powers due to the reflected waves from a single target. It is learned that by using the method of calculation of power of the present invention, the angle powers at the power values of the receive signals can be detected considerably stably and that the detected values are values equivalent to the straight line parts shown by the two broken lines.

Here, as shown in FIG. 10A to FIG. 10E, evaluation systems are prepared in which one target (FIG. 10A), two targets (FIG. 10B), three targets (FIG. 10C), four targets (FIG. 10D), and five targets (FIG. 10E) are arranged. Further, each evaluation system is sent radio waves from the radar device 100 a total of 100 times. FIG. 11 shows all together the angle powers at the power values of the orthogonal components obtained by using the method of calculation of power of the present invention for receive signals obtained by reception of reflected waves at antennas in the different evaluation systems. The horizontal line shown in bold in the figure is the threshold value R for judging the separable number and is a value similar to the threshold value of FFT.

As will be understood from FIG. 11, when reflected waves from the separable number or less (in embodiment of FIG. 11, three or less) of targets are received as arrival waves at the antennas and the angles can be estimated accurately, the angle powers at the power values of the orthogonal components are smaller than the threshold value R. On the other hand, when reflected waves from the separable number or more (in embodiment of FIG. 11, four or more) of targets are received as arrival waves at the antennas and the angles cannot be estimated accurately, the angle powers at the power values of the orthogonal components are larger than the threshold value R.

By viewing the angle powers at the power values of the orthogonal components, it is possible to judge if the separable number or more of arrival waves of received waves have arrived. Note that, when reflected waves from the separable number or more of targets have been received as arrival waves at the antennas, the angles cannot be accurately obtained even by the method of the present invention. Such a judgment can be used for judgment for changing to a separating means with a higher separable number of received waves.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A radar device comprising:
    a plurality of antennas that send out radio waves and receive waves reflected from at least one target and
    a signal processing unit that processes the receive signals received by said plurality of antennas using a predetermined angle estimation system, estimates directions of arrival of the reflected waves, and calculates receive powers of the reflected waves to detect targets,
    said signal processing unit further comprising:
    an angle detecting unit that detects angles of directions of arrival of said reflected waves based on angles of peaks of the receive signals of the antennas,
    a memory that stores mode vectors that are found as theoretical values or measured values for predetermined angles,
    a mode vector calculating unit which finds mode vectors for said detected angles by reading the mode vectors out from the memory,
    a vector combining portion that generates a combined vector by combining the peak powers after FFT processing of the receive signal used for the angle detection, a decomposing unit that uses the mode vectors as the basis to decompose the combined vector into vectors of directions of the mode vectors, and a power value calculating unit that calculates the magnitudes of vectors of the mode vector directions of the decomposed receive signal as power values of the detected angles.

2. A radar device as set forth in claim 1, wherein
when said decomposing unit decomposes receive signals into vectors, it additionally decomposes them into vectors which are orthogonal to all of the mode vectors for said detected angles, and said power value calculation unit calculates the powers for the bearings of the receive signals decomposed into vectors.

3. A radar device as set forth in claim 2, wherein when there are four receive antennas,
said angle detection unit uses said angle estimation system to detect angles of the directions of arrival of the reflected waves as θ1, θ2, and θ3, said mode vector calculation unit codes the mode vectors as follows:

$a(\theta 1) = (a11, a12, a13, a14)$ $a(\theta 2) = (a21, a22, a23, a24)$ $a(\theta 3) = (a31, a32, a33, a34)$ said decomposing unit sets the following "A", $$A = \begin{array}{|c|c|c|} \hline a11 & a21 & a31 \\ \hline a12 & a22 & a32 \\ \hline a13 & a23 & a33 \\ \hline a14 & a24 & a34 \\ \hline \end{array}$$

next, calculates vectors P orthogonal to the three mode vectors using a propagator method while setting A1 and A2 as follows:

$$A1 = \begin{array}{|c|c|c|} \hline a11 & a21 & a31 \\ \hline a12 & a22 & a32 \\ \hline a13 & a23 & a33 \\ \hline \end{array}$$

$$A2 = \begin{array}{|c|c|c|} \hline a14 & a24 & a34 \\ \hline \end{array}$$

$$P = \begin{pmatrix} (A2 * A1^{-1})^H \\ -1 \end{pmatrix}$$

$= (p1, p2, p3, p4)^t$ determines a matrix of the mode vectors plus the orthogonal components as follows:

$$B = \begin{array}{|c|c|c|c|} \hline a11 & a21 & a31 & p1 \\ \hline a12 & a22 & a32 & p2 \\ \hline a13 & a23 & a33 & p3 \\ \hline a14 & a24 & a34 & p4 \\ \hline \end{array}$$

defines the receive signals of said four antennas as Y1 to Y4 and converts the receive signals to vectors as follows:

$$Y = \begin{array}{|c|} \hline Y1 \\ \hline Y2 \\ \hline Y3 \\ \hline Y4 \\ \hline \end{array}$$

and,
further, uses said B and said Y for the following calculations to find the coefficients of the bases of the mode vectors and orthogonal components, $$B^{-1} Yn = \begin{array}{|l|} \hline bn1 (= \text{coefficient of } \theta 1 \text{ bearing}) \\ \hline bn2 (= \text{coefficient of } \theta 2 \text{ bearing}) \\ \hline bn3 (= \text{coefficient of } \theta 3 \text{ bearing}) \\ \hline bn4 (= \text{coefficient of orthogonal components}) \\ \hline \end{array} \quad (= BN)$$

and,
said power calculation unit calculates the norms of bn1 to bn4 found here and finds the power values of the bearings of the corresponding arrival waves and power values of the orthogonal components.

4. A radar device as set forth in claim 3, wherein when there are four receive antennas and no orthogonal components of the receive powers, said angle detection unit detects the angles of the direction of arrivals of the reflected waves by said angle estimation system as θ1, θ2, and θ3, said mode vector calculation unit codes the mode vectors as follows:

$a(\theta 1) = (a11, a12, a13, a14)$ $a(\theta 2) = (a21, a22, a23, a24)$ $a(\theta 3) = (a31, a32, a33, a34)$ said decomposing unit sets the following "A":

$$A = \begin{array}{|c|c|c|} \hline a11 & a21 & a31 \\ \hline a12 & a22 & a32 \\ \hline a13 & a23 & a33 \\ \hline a14 & a24 & a34 \\ \hline \end{array}$$

defines the desired value as BN and defines the following evaluation function:

$Q(BN) = \|Y - A*BN\|$ (where, $\|\cdot\|$ is a vector norm)

develops said Q(BN) further and performs the following calculations while defining "tr" as the trace of the matrix and "H" as an adjoint matrix, $Q(BN) = \|Y - A*BN\|$ $= tr((Y - A*BN)^H * (Y - A*BN))$ $= tr(Y^H * Y) - tr(Y^H * A * BN) - tr(BN^H * A^H * Y) + tr(BN^H * A^H * A * BN)$ and,
said power calculation unit uses the following formula $BN = (A^H * A)^{-1} * A^H * Y$ to calculate said BN, under the condition that the value obtained by differentiating this by $BN^H$ ($-A^{H}*Y+ A^{H}*A*BN$) becomes "0," and finds the power values of the bearings of the corresponding arrival waves and the power values of the orthogonal components.

5. A radar device as set forth in claim 1, wherein said signal processing unit processes the receive signals using the Capon method.

6. A method of calculation of receive power in a radar device comprising sending out radio waves, receiving radio waves which are reflected from at least one target at a plurality of antennas, processing the receive signals using a predetermined angle estimation system, estimating the directions of arrival of the reflected waves, and calculating receive powers of the reflected waves to detect the targets, characterized by detecting angles of directions of arrival of said reflected waves based on angles of peaks of the receive signals of the antennas, storing, in a memory, mode vectors that are found as theoretical values or measured values for predetermined angles, finding mode vectors for the detected angles by reading out the mode vectors from the memory, generating a combined vector by combining the peak powers after FFT processing of the receive signal used for the angle detection, using the mode vectors as the basis to decompose the combined vector of the receive signals into vectors of directions of the mode vectors, and defining the magnitudes of the vectors of the mode vector directions of the decomposed receive signals as the power values of the detected angles.

7. A method of calculation of receive power in a radar device as set forth in claim 6, further comprising, when decomposing receive signals into vectors, additionally decomposing them into vectors which are orthogonal to all of the mode vectors for said detected angles and calculating the powers for the bearings of the receive signals decomposed into vectors.

8. A method of calculation of receive power in a radar device as set forth in claim 7, further comprising, when there are four receive antennas, using said angle estimation system to detect angles of the directions of arrival of the reflected waves as θ1, θ2, and θ3, coding the mode vectors as follows:

$a(θ1)=(a11, a12, a13, a14)$ $a(θ2)=(a21, a22, a23, a24)$ $a(θ3)=(a31, a32, a33, a34)$ setting the following "A", $$A = \begin{bmatrix} a11 & a21 & a31 \\ a12 & a22 & a32 \\ a13 & a23 & a33 \\ a14 & a24 & a34 \end{bmatrix}$$

next, calculating vectors P orthogonal to the three mode vectors using a propagator method while setting A1 and A2 as follows:

$$A1 = \begin{bmatrix} a11 & a21 & a31 \\ a12 & a22 & a32 \\ a13 & a23 & a33 \end{bmatrix}$$

$$A2 = \begin{bmatrix} a14 & a24 & a34 \end{bmatrix}$$

$$P = \begin{pmatrix} (A2*A1^{-1})^H \\ -1 \end{pmatrix} = (p1, p2, p3, p4)^t$$

determining the matrix of the mode vectors plus the orthogonal components as follows:

$$B = \begin{bmatrix} a11 & a21 & a31 & p1 \\ a12 & a22 & a32 & p2 \\ a13 & a23 & a33 & p3 \\ a14 & a24 & a34 & p4 \end{bmatrix}$$

defining the receive signals of said four antennas as Y1 to Y4 and converting the receive signals to vectors as follows:

$$Y = \begin{bmatrix} Y1 \\ Y2 \\ Y3 \\ Y4 \end{bmatrix}$$

further, using said B and said Y for the following calculations to find the coefficients of the bases of the mode vectors and orthogonal components, $$B^{-1}Y = \begin{bmatrix} bn1 (= \text{coefficient of } θ1 \text{ bearing}) \\ bn2 (= \text{coefficient of } θ2 \text{ bearing}) \\ bn3 (= \text{coefficient of } θ3 \text{ bearing}) \\ bn4 (= \text{coefficient of orthogonal components}) \end{bmatrix} (= BN)$$

calculating the norms of bn1 to bn4 found here and finding the power values of the bearings of the corresponding arrival waves and power values of the orthogonal components.

9. A method of calculation of receive power in a radar device as set forth in claim 8, further comprising, when there are four receive antennas, detecting the angles of the direction of arrivals of the reflected waves by said angle estimation system as θ1, θ2, and θ3, coding the mode vectors as follows:

$a(θ1)=(a11, a12, a13, a14)$ $a(θ2)=(a21, a22, a23, a24)$ $a(θ3)=(a31, a32, a33, a34)$ setting the following "A":

$$A = \begin{array}{|c|c|c|} \hline a11 & a21 & a31 \\ \hline a12 & a22 & a32 \\ \hline a13 & a23 & a33 \\ \hline a14 & a24 & a34 \\ \hline \end{array}$$

defining the following evaluation function:

$Q(BN)=\|Y-A*BN\|$ (where, $\|\cdot\|$ is a vector norm)

developing said Q(BN) further and performing the following calculation while defining "tr" as the trace of the matrix and H as an adjoint matrix, $$Q(BN) = \|Y - A*BN\|$$

$$= tr((Y - A*BN)^H * (Y - A*BN))$$

$$= tr(Y^H * Y) - tr(Y^H * A * BN) - tr(BN^H * A^H * Y) + tr(BN^H * A^H * A * BN)$$

making the value obtained by differentiating this by $BN^H$ ($-A^H*Y+A^H*A*BN$) "0" and using the following formula $$BN = (A^H*A)^{-1}*A^H*Y$$

to calculate said BN, under the condition that the value obtained by differentiating this by $BN^H$ ($-A^H*Y+A^H*A*BN$) becomes "0," and finding the power values of the bearings of the corresponding arrival waves and the power values of the orthogonal components.

10. A method of calculation of receive power in a radar device as set forth in claim 6, wherein said signal processing unit processes the receive signals using the Capon method.

* * * * *